United States Patent
Schlegel et al.

(10) Patent No.: US 10,252,742 B2
(45) Date of Patent: Apr. 9, 2019

(54) ELECTROMECHANICAL POWER STEERING SYSTEM

(71) Applicants: ThyssenKrupp Presta AG, Eschen (LI); ThyssenKrupp AG, Essen (DE)

(72) Inventors: Ulrich Schlegel, Fläsch (CH); Manuel Büchel, Buchs (CH); Patrick Renggli, Zürich (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 0 days.

(21) Appl. No.: 15/328,173

(22) PCT Filed: Jun. 24, 2015

(86) PCT No.: PCT/EP2015/064192
§ 371 (c)(1),
(2) Date: Jan. 23, 2017

(87) PCT Pub. No.: WO2016/012181
PCT Pub. Date: Jan. 28, 2016

(65) Prior Publication Data
US 2017/0217476 A1    Aug. 3, 2017

(30) Foreign Application Priority Data

Jul. 22, 2014    (DE) .................. 10 2014 110 306

(51) Int. Cl.
*F16H 57/021*    (2012.01)
*B62D 5/04*    (2006.01)
(Continued)

(52) U.S. Cl.
CPC ............ *B62D 5/0409* (2013.01); *F16H 1/16* (2013.01); *F16H 55/24* (2013.01); *F16H 57/021* (2013.01); *F16H 2057/0213* (2013.01)

(58) Field of Classification Search
CPC ......... B62D 5/0409; F16H 1/16; F16H 55/24; F16H 57/021; F16H 2057/0213
See application file for complete search history.

(56) References Cited

U.S. PATENT DOCUMENTS

| 8,667,858 | B2 * | 3/2014 | Fuechsel | .............. | B62D 5/0409 |
| | | | | | 384/535 |
| 2001/0040067 | A1 * | 11/2001 | Murakami | ........... | B62D 5/0409 |
| | | | | | 180/444 |

(Continued)

FOREIGN PATENT DOCUMENTS

| DE | 10 2011 015 883 A1 | 10/2012 |
| DE | 102012103146 A1 | 10/2013 |

(Continued)

OTHER PUBLICATIONS

English translation of International Search Report for International patent application No. PCT/EP2015/064192; dated Oct. 29, 2015.

(Continued)

*Primary Examiner* — Kevin Hurley
*Assistant Examiner* — Michael R Stabley
(74) *Attorney, Agent, or Firm* — thyssenkrupp North America, Inc.

(57) ABSTRACT

An electromechanical power steering system for a motor vehicle may include a driving worm that is driven by an electric motor and acts on a worm gear that is coupled to a steering shaft. The driving worm may be mounted in such a way that it can rotate about its worm axis. More particularly, the driving worm may be mounted in a bearing that is held in a mount. The mount may prestress the driving worm in a direction of the worm gear. In some examples, the mount is torsionally weak about a torsion axis that is positioned perpendicularly with respect to the worm axis.

7 Claims, 3 Drawing Sheets

(51) Int. Cl.
*F16H 1/16* (2006.01)
*F16H 55/24* (2006.01)

(56) References Cited

U.S. PATENT DOCUMENTS

| | | | | |
|---|---|---|---|---|
| 2003/0099417 | A1* | 5/2003 | Bauer | F16C 27/04 |
| | | | | 384/535 |
| 2009/0314114 | A1* | 12/2009 | Grosberg | F16H 55/24 |
| | | | | 74/409 |
| 2012/0125132 | A1* | 5/2012 | Bernhard | B62D 5/0409 |
| | | | | 74/89.14 |
| 2012/0227526 | A1* | 9/2012 | Lescorail | F16H 55/24 |
| | | | | 74/406 |
| 2012/0272765 | A1* | 11/2012 | Fuechsel | B62D 5/0409 |
| | | | | 74/416 |
| 2013/0025960 | A1* | 1/2013 | Hama | B62D 5/0409 |
| | | | | 180/444 |
| 2014/0020973 | A1 | 1/2014 | Galehr | |
| 2015/0040699 | A1* | 2/2015 | Hafermalz | F16H 57/039 |
| | | | | 74/89.16 |

FOREIGN PATENT DOCUMENTS

| | | |
|---|---|---|
| DE | 10 2013 213 708 A1 | 1/2015 |
| EP | 2 423 075 A2 | 2/2012 |
| KR | 1020100102347 A | 9/2010 |
| WO | 2013/152995 A1 | 10/2013 |

OTHER PUBLICATIONS

English Language Abstract for DE 102012103146 A1.

* cited by examiner

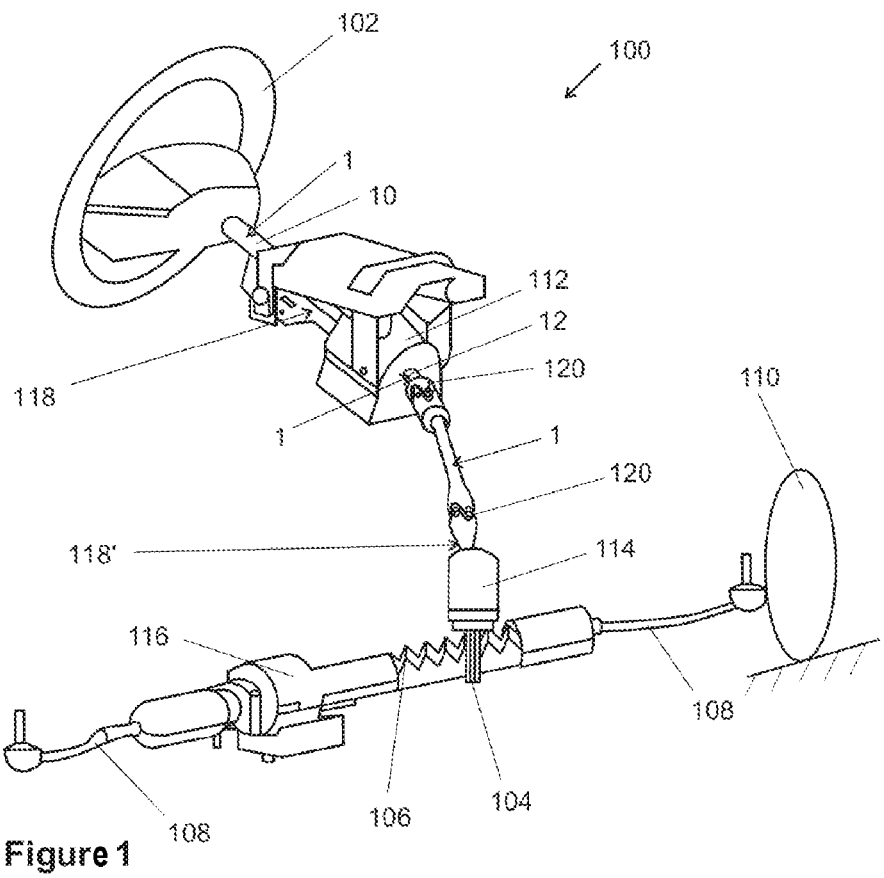
Figure 1
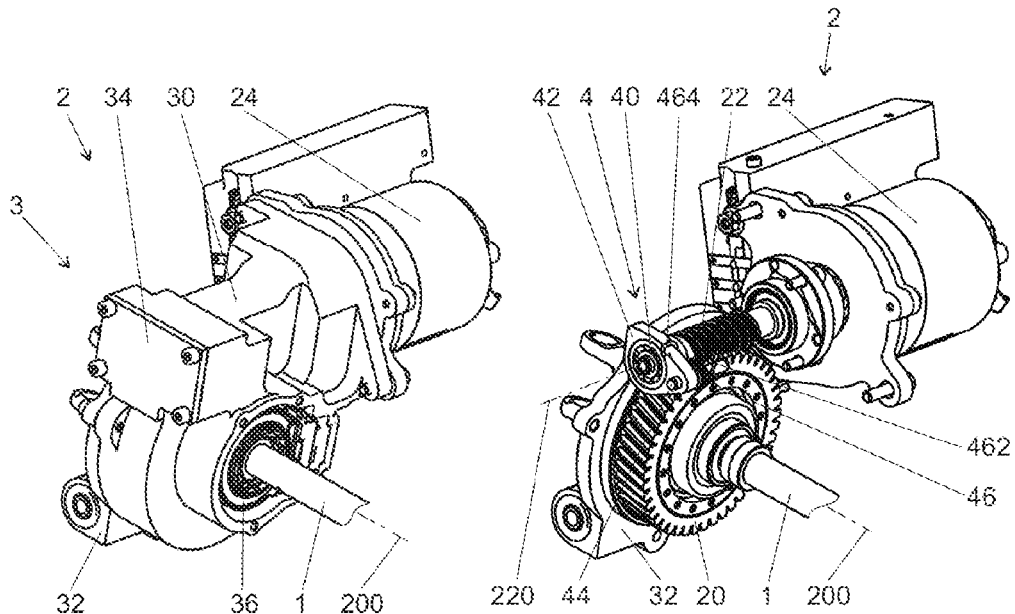
Figure 2
PRIOR ART
Figure 3
PRIOR ART

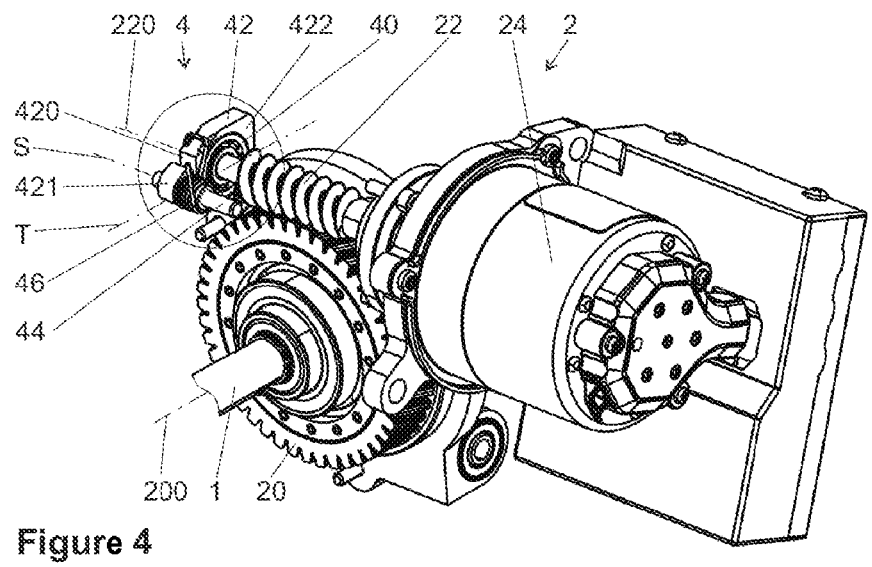
Figure 4
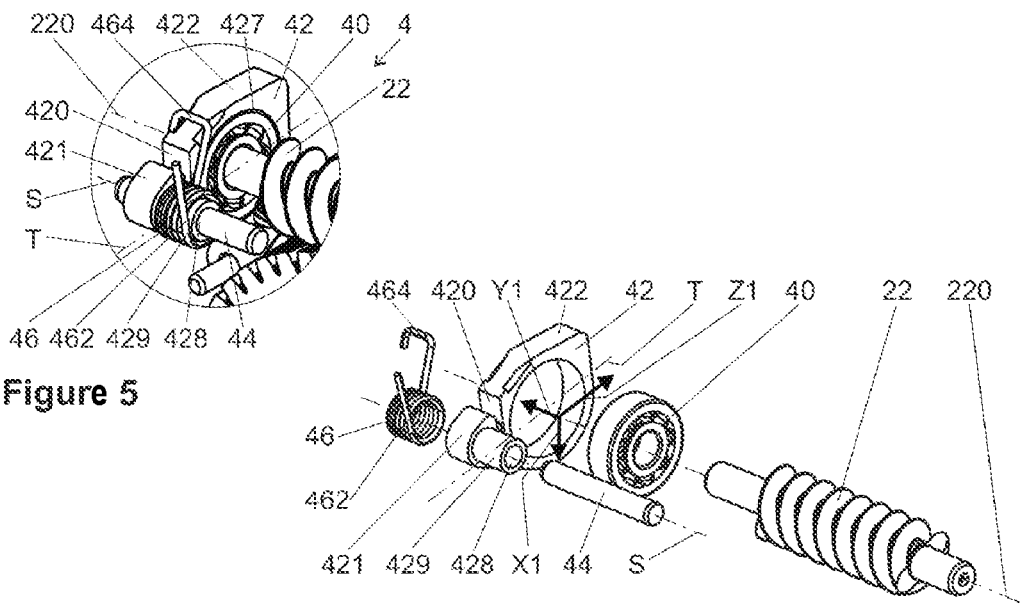
Figure 5
Figure 6
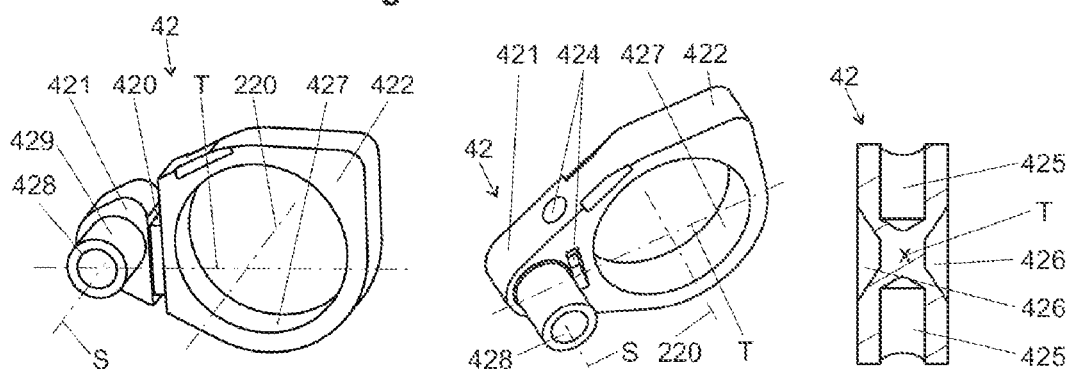
Figure 7
Figure 8
Figure 9

ELECTROMECHANICAL POWER STEERING SYSTEM

CROSS REFERENCE TO RELATED APPLICATIONS

This application is a U.S. National Stage Entry of International Patent Application Serial Number PCT/EP2015/064192, filed Jun. 24, 2015, which claims priority to German Patent Application No. DE 10 2014 110 306.8 filed Jul. 22, 2014, the entire contents of both of which are incorporated herein by reference.

FIELD

The present disclosure generally relates to electromechanical power steering system for a motor vehicle for assisting the steering movements.

BACKGROUND

In the prior art, electromechanical power steering systems with electromechanical devices for assisting the steering movements are known. An electromechanical power steering system has an input shaft which is connected to a steering wheel and via which the driver applies the steering instructions in the form of steering torques. An output shaft which is connected to the input shaft transmits the steering torques via track rods to the wheels to be steered. In order to determine a necessary assistance force for the steering movement, the input shaft and the output shaft are usually connected to one another elastically via a torsion bar, wherein the torque which is applied to the input shaft by the driver can be determined by determining a relative rotation between the input shaft and the output shaft.

Power assistance systems, for example electric power assistance systems or electromechanical power assistance systems, are usually employed to apply the corresponding auxiliary torques to the output shaft, to the steering pinion or to the toothed rack. The respective power assistance system is actuated here by determining the torque input into the input shaft via the driver via the steering wheel with respect to the output shaft.

In electromechanical power assistance systems for electromechanical power steering systems it is known to apply the respective assistance force by means of an electric motor, wherein the auxiliary force is transmitted, for example via a driving worm, to a worm gear which is coupled to the steering train. For this purpose, the electric motor is usually coupled to the driving worm, either by direct attachment of the driving worm to the output shaft of the electric motor, or by means of a gear mechanism connected between the electric motor and the driving worm. The driving worm acts on a worm gear which transmits the torque to the actual steering train via, for example, a gear mechanism, a toothed rack mechanism or a belt drive. In this context, the power assistance system can input the assistance force, for example, in the region of the steering shaft, of the steering pinion or of the toothed rack.

The driving worm is usually mounted in a housing of the device by means of a bearing. In order to make available play-free setting of the toothing between the driving worm and the worm gear, making it possible to avoid undesired generation of noise which can occur, for example, owing to alternating bearing of the worm gear against the two tooth edges of the driving worm during oscillating steering about a central position when travelling straight ahead, it is known to arrange the receptacle drilled hole of the inner ring of the bearing eccentrically with respect to the external face of the outer ring of the bearing and to prestress, usually in a spring-assisted fashion, the eccentric which is generated as a result.

DE 10 2011 015 883 A1 discloses an electromechanical power steering system in which an eccentric lever which can pivot about a pivoting axis prestresses a driving worm, mounted therein by means of an industrial roller bearing, against the worm gear via a spring which is attached to the eccentric lever and to a housing. With this design, and given a rigid eccentric, the bearing rings can tilt with respect to one another when the eccentric lever pivots. Also, the resulting S-shaped bending of the driving worm owing to the bearing which is flexurally rigid on both sides can bring about forced states in the toothing between the driving worm and the worm gear, since no angle compensation means is made available. In addition, the pivoting axis of the eccentric lever can tilt.

EP 2 423 075 A2 presents an electric steering system having a power assistance system in which a roller bearing which bears the driving worm is arranged between the bearing and the housing of the power assistance system by means of a sprung ring, wherein the sprung ring has leaf spring elements. Since the bearing can tilt in all directions, a defined axis for angle compensation is consequently not made available. In addition, the rigidity of the holder of the driving worm is reduced by the use of the sprung ring.

BRIEF DESCRIPTION OF THE FIGURES

FIG. 1 is a schematic perspective view of an example steering system of a motor vehicle having a power assistance system.

FIG. 2 is a schematic view of a conventional device for applying an auxiliary force in an electromechanical power steering system.

FIG. 3 is a schematic perspective view of parts of the device of FIG. 2 with an opened housing.

FIG. 4 is a schematic perspective view of an example opened device for applying an auxiliary force to an electromechanical power steering system.

FIG. 5 is a detail view taken with respect to FIG. 4.

FIG. 6 is a schematic, exploded view of an example bearing device and of an example driving worm of the worm drive of FIGS. 4 and 5.

FIG. 7 is a schematic perspective view of an example mount for the bearing for supporting the driving worm of the worm drive in FIGS. 4 to 6.

FIG. 8 is a schematic perspective view of an example mount for a bearing for supporting a driving worm of another example worm drive.

FIG. 9 is a schematic sectional view taken through the mount in FIG. 8.

DETAILED DESCRIPTION

Figure 10:
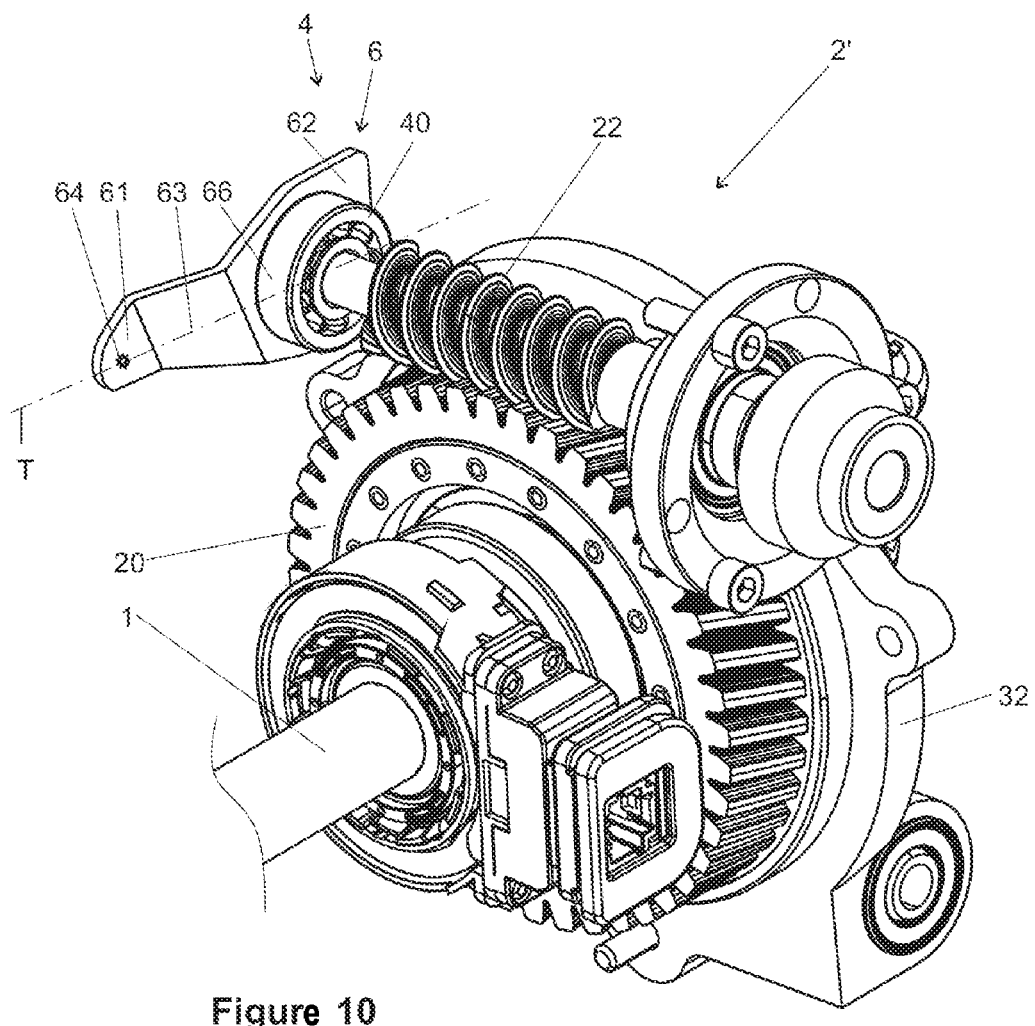
FIG. 10 is a schematic perspective view of parts of an example device for applying an auxiliary force in an electromechanical power steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Taking the prior art as a starting point, an object of the present invention is to make available an electromechanical power steering system which exhibits improved bearing behavior.

Correspondingly, an electromechanical power steering system for a motor vehicle is proposed, comprising a driving worm which is driven by an electric motor and interacts with a worm gear which is coupled to a steering shaft, wherein the driving worm is mounted, in such a way that it can rotate about its worm axis, in a bearing which is held in a mount, and the mount prestresses the driving worm in the direction of the worm gear. According to the invention, the mount is embodied so as to be torsionally weak about a torsion axis which is arranged perpendicularly with respect to the worm axis.

Torsionally weak is understood as meaning that the mount has lower torsional rigidity about the torsion axis arranged perpendicularly with respect to the worm axis than about the worm axis.

As a result of the fact that the mount is embodied so as to be torsionally weak about a torsion axis perpendicular with respect to the worm axis, angle compensation between the worm axis and the bearing which supports the driving worm radially can take place. In particular, as a result it is possible to make available to the driving worm, via the torsion axis of the mount, a defined pivoting axis about which angle compensation can take place. In one development, this angle compensation means can be embodied with elastic prestress, which can be configured by the corresponding embodiment of the torsional rigidity about the torsion axis. Furthermore, by making available the mount which can be twisted about a torsion axis in order to compensate angles, the stability and the rigidity of the bearing of the driving worm can be increased compared to the prior art. It is therefore possible to achieve better driving behavior and an improved noise behavior. Furthermore, the bearing behavior can be improved by reducing or damping the degrees of freedom of the bearing with respect to the pivoting about other axes than the torsion axis which is made available. For example, with respect to reducing the scope of movement, hysteresis effects can be reduced by the driving worm swinging to and fro during a change of load.

Since the angle compensation takes place by means of the torsion of the mount within the mount, a standard roller bearing can be used which is easy and cost-effective to manufacture and does not make any particular requirements of the installation or the manufacturing.

Furthermore, by making available the twistable mount it is ensured that no additional parts which could reduce the rigidity of the bearing are necessary to implement the angle compensation means.

The bearing which is used is preferably a roller bearing, but other types of bearing are also conceivable.

In one development, the mount is made available in the form of an elastic sheet-metal part. As a result of the intrinsic elasticity of the sheet-metal part, the sheet-metal part can be embodied so as to be torsionally weak along the torsion axis, with the result that in the case of an angular deviation the sheet-metal part can be twisted in accordance with an angular offset or a change in angle of the worm axis with respect to the initial position. Furthermore, the radial prestressing of the driving worm in the direction which points toward the worm gear can be made available by virtue of the fact that the sheet-metal part already has defined torsion in the installed state. Such a sheet-metal part is also cost-effective to manufacture and requires little maintenance.

The outer ring of the bearing can preferably be pressed into a receptacle drilled hole in the sheet-metal part. Alternatively the receptacle drilled hole for the bearing can be provided with at least one corresponding bearing projection which positions the bearing axially or, if appropriate, supports it axially. In a further embodiment, a receptacle sleeve can be provided for holding the bearing on the sheet-metal part. This receptacle sleeve can be embodied in one piece with the mount in the form of a deep-drawn collar.

In one preferred embodiment, in the installed state the sheet-metal part can have axial prestress in the direction of the worm axis, as a result of which the bearing of the driving worm can be additionally stabilized, and, in particular, the noise behavior can be improved further.

In one development, the mount can be attached in a rotationally fixed fashion to a housing which surrounds the device. The mount is preferably embodied here as a sheet-metal part which is spot-welded to the housing with predefined orientation which correspondingly conditions the prestress. Alternatively, the sheet-metal part can also have a circumferential welding seam or can be attached by screwing, riveting or caulking.

The direct attachment of the sheet-metal part to the housing can permit direct transmission of force between the sheet-metal part and the housing, which permits a high degree of rigidity and a high level of positional accuracy of the sheet-metal part.

The sheet-metal part is preferably oriented in such a way that its thickness direction is arranged essentially parallel with respect to the worm axis. This makes it possible to ensure that the torsion axis of the sheet-metal part is embodied perpendicularly with respect to the worm axis. Furthermore, by virtue of this orientation of the thickness direction the sheet-metal part has elasticity in the direction of the worm axis by which axial prestress can be applied to the bearing or to the driving worm owing to slight elastic bending of the sheet-metal part in the direction of the worm axis, as a result of which secure bearing is provided.

In one alternative embodiment, the mount is arranged so as to be pivotable about a pivoting axis, wherein the pivoting axis lies outside the bearing which is arranged in the mount, and the mount is preferably pivotably mounted on the housing.

As a result of the pivotable arrangement of the mount about the pivoting axis, a change in the toothing between the driving worm and the worm gear owing, for example, to loading during operation, owing to temperature influences or owing to wear, can be compensated. Furthermore, defined prestress of the driving worm against the worm gear can be brought about with simple means by prestressing the mount about the pivoting axis in the direction of the worm gear.

In one development, the mount has at least one region, having at least one material cutout, for making available the reduced torsional rigidity. The at least one material cutout is preferably oriented perpendicularly with respect to the desired torsion axis of the mount. The at least one region which has the at least one material cutout particularly preferably divides the mount into a first region, in which the mount is supported so as to be pivotable about the pivoting axis, and a second region, in which the bearing receptacle for the bearing which supports the driving worm is provided. The second region of the mount can correspondingly be twisted with respect to the first region, about the torsion axis.

The region having the material cutout is preferably embodied in such a way that the mount has the lowest torsional rigidity, that is to say is most torsionally weak, about the torsion axis. The mount is preferably embodied so as to be more rigid about all the other axes. Since the mount is more rigid about the other axes, a prestress of the driving worm in the direction of the worm gear can simultaneously be applied, in particular in the transverse direction with respect to the pivoting axis, but the angle compensation can be made available. The mount preferably differs in terms of its torsional rigidity from the axes which do not coincide with the torsion axis, or does not differ substantially from a mount with the same dimensions and made of the same material but without a material cutout.

In one preferred embodiment, the at least one material cutout is made available in the form of a circumferential material reduction of the mount in the at least one region with reduced torsional rigidity. As a result of the embodiment of the at least one material cutout in this form, a mount having the abovementioned properties can be made available which is easy to fabricate. Furthermore, the region with reduced torsional rigidity can be embodied to be very compact. The reduction of the dimensions of the mount in the direction of the pivoting axis or of the worm axis is preferably smaller than the reduction in the dimensions of the mount perpendicularly with respect to the pivoting axis and with respect to the torsion axis. As a result, the rigidity of the mount in the direction of the pivoting axis can be essentially retained in comparison with a fully embodied mount.

In one development, the at least one material cutout can be made available in the form of a drilled hole and/or a groove. The drilled hole and/or the groove are preferably arranged orthogonally with respect to the torsion axis of the mount and centrally in the component, measured in the direction of the pivoting axis of the component. In other words, the central axis of the drilled hole and/or of the groove is preferably made available concentrically with respect to at least one main axis of the mount. The drilled hole and/or the groove are preferably arranged in such a way that the axial geometrical moments of inertia and therefore the flexural rigidities of the mount remain essentially uninfluenced in the region having the drilled hole and/or the groove.

Since the drilled hole and/or the groove on the mount generate at least one region which is open at the edge, the torsion geometrical moment of inertia and therefore the torsional rigidity is reduced in this region compared to a mount with a closed cross section.

At least one rotational spring, preferably a leg spring, is preferably provided in order to apply the prestress of the driving worm against the worm gear. The rotational spring is particularly preferably arranged on the mount and is quite particularly preferably supported on the housing in order to make available the prestress of the mount and therefore the prestress of the driving worm in the direction of the worm gear. As a result of the use of a rotational spring, the bearing device can be made compact, since the rotational spring can be arranged directly on the mount. Furthermore, no additional elements such as, for example, hooks, eyelets or particularly configured surfaces, have to be made available for producing support on the housing.

In one alternative embodiment, other types of rotational spring or other spring types, for example one or more tensile springs, leaf springs or compression springs or alternative elements for applying a prestressing force such as, for example, magnets can be used to apply the prestress.

The mount is particularly preferably embodied so as to be torsionally weaker about the torsion axis than about any axis arranged perpendicularly with respect to the torsion axis. Therefore, it can correspondingly be ensured that the mount permits angle compensation but at the same time permits the bearing to be held securely in its axial direction and for the prestress of the driving worm with respect to the worm gear to be applied safely.

In the text which follows, preferred exemplary embodiments are described with reference to the figures. Here, identical, similar or identically acting elements are denoted by identical reference symbols in the different figures, and only partial repeated description of these figures will be given in the following description in order to avoid redundancy.

FIG. 1 shows a schematic illustration of an electromechanical power steering system 100, wherein a driver can apply a corresponding torque as a steering command into a steering shaft 1 via a steering wheel 102. The torque is then transmitted via the steering shaft 1 to a steering pinion 104 which meshes with a toothed rack 106, which itself then transmits the predefined steering angle to the steerable wheels 110 of the motor vehicle via corresponding track rods 108.

An electric power assistance system can be provided in the form of a power assistance system 112 which is coupled to the steering shaft 1, a power assistance system 114 which is coupled to the pinion 104, and/or a power assistance system 116 which is coupled to the toothed rack 106. The respective power assistance system 112, 114 or 116 inputs an auxiliary force into the steering shaft 1, the steering pinion 104 and/or the toothed rack 106, as a result of which the driver is assisted during the steering work. The three different power assistance systems 112, 114 and 116 which are illustrated in FIG. 4 show possible positions for their arrangement. Other positions are also conceivable. Usually only one of the positions shown is occupied by a power assistance system, and correspondingly only a single power assistance system is provided.

The auxiliary force which is to be applied by means of the respective power assistance system 112, 114 or 116 in order to assist the driver is determined by taking into account an input torque which is acquired by a torque sensor 118. Alternatively or in combination with the inputting of the auxiliary force, an additional steering angle can be introduced into the steering system with the power assistance system 112, 114, 116, which steering angle is added with the steering angle applied by the driver via the steering wheel 102.

The steering shaft 1 has an input shaft 10 which is connected to the steering wheel 102 and an output shaft 12 which is connected to the toothed rack 106 via the steering pinion 104. The input shaft 10 and the output shaft 12 are coupled to one another in a rotationally elastic fashion by means of a torsion bar which cannot be seen in FIG. 1. Therefore, a torque which is input into the input shaft 10 by a driver via the steering wheel 102 brings about a relative rotation of the input shaft 10 with respect to the output shaft 12 whenever the output shaft 12 does not rotate exactly in synchronism with the input shaft 10. This relative rotation between the input shaft 10 and the output shaft 12 can be measured, for example, by means of a rotational angle sensor, and a corresponding input torque relative to the output shaft can be determined correspondingly on the basis of the known torsional rigidity of the torsion bar. In this way, the torque sensor 118 is formed by the determination of the relative rotation between the input shaft 10 and the output shaft 12. Such a torque sensor 118 is basically known and can be implemented, for example, in the form of an electromagnetic, optical measurement or some other measurement of the relative rotation of the input shaft 10 with respect to the output shaft 12.

Correspondingly, a torque which is applied by the driver to the steering shaft 1 or the input shaft 10 via the steering wheel 102 will bring about the inputting of an auxiliary torque by one of the power assistance systems 112, 114, 116 only if the output shaft 12 rotates relative to the input shaft 10 counter to the rotational resistance of the torsion bar.

The torque sensor 118 can alternatively also be arranged at the position 118', wherein the breakthrough of the steering shaft 1 into the input shaft 10 and the output shaft 12 and the rotational elastic coupling by means of the torsion bar is then correspondingly present at a different position in order to be able to determine a relative rotation, and therefore correspondingly an input torque and/or an auxiliary force to be input, from the relative rotation of the output shaft 12 which is coupled to the input shaft 10 by means of the torsion bar.

The steering shaft 1 in FIG. 1 also comprises at least one Cardan joint 120 by means of which the profile of the steering shaft 1 in the motor vehicle can be adapted to the spatial and/or structural conditions.

FIGS. 2 and 3 show a conventional electromechanical power steering system 100. The schematic design from FIGS. 2 and 3 of the electromechanical power steering system 100 is also used as the basis for the following embodiments in FIGS. 4 to 10.

Here, a schematic illustration shows a device 2 for applying an auxiliary force in an electromechanical power steering system 100. The device 2 is connected to the steering shaft 1 of the electromechanical power steering system 100 and correspondingly serves to apply an auxiliary force to the steering shaft 1.

As is apparent, for example, from FIG. 3, the steering shaft 1 is connected in a rotationally fixed fashion in a manner known per se to a worm gear 20 which is applied to the steering shaft 1. The worm gear 20 can rotate together with the steering shaft 1 about a worm gear axis 200 which is arranged coaxially with respect to the axis of the steering shaft 1 in this region.

The worm gear 20 is driven by means of a driving worm 22 which meshes with the latter and which has a first end 222 and a second end 224. The driving worm 22 is coupled at its first end 222 to the output of an electric motor 24, in order to transmit, by means of the electric motor 24, an auxiliary force and/or an additional steering angle via the driving worm 22 to the worm gear 20 and then to the steering shaft 1 and therefore into the steering train of the electromechanical power steering system 100. The driving worm 22 has a worm axis 220, about which it rotates when a torque is applied by the output of the electric motor 24. Such a worm drive for applying an auxiliary force to a steering shaft 1 of an electromechanical power steering system 100 is basically known.

The second end 224, lying opposite the output of the electric motor 24, of the driving worm 22 is mounted in a bearing 40 and supported radially thereby. The bearing 40 is held in a mount 42 which is pivotably mounted on the housing by means of a pin 44 which forms a pivoting axis S. The pivoting axis S is embodied essentially parallel to the worm axis 220 when the latter is in the unloaded state. The term "essentially parallel" is understood as meaning a deviation from the parallelism of at maximum +/−5°. Furthermore, the pivoting axis S extends also essentially perpendicularly with respect to the worm gear axis 200 of the worm gear 20. The term "essentially perpendicularly" is understood here to mean an angle between 85° and 95° which is enclosed between the axes.

The mount 42 is prestressed toward the worm gear 20 about the pivoting axis S by means of a prestressing means described below. The prestressing correspondingly places the driving worm 22 in engagement with the worm gear 20 and holds it there in such a way that engagement with little play can occur over the entire service life of the electromechanical power steering system 100.

The prestressing is applied in the exemplary embodiments shown by means of a prestressing means which is embodied as a leg spring 46 and is described in detail with respect to the first exemplary embodiment in FIGS. 4 to 7. However, other prestressing means are also conceivable.

As is apparent from FIG. 2, the electric motor 24 is attached to a housing 3, wherein the output of the electric motor 24 is located in the interior of the housing 3. The housing 3 is embodied in three parts and has a base body 30, a housing flange 32 and a cover plate 34. The steering shaft 1 leads into the interior of the housing 3 and is mounted therein by means of a bearing which radially supports the steering shaft 1 in the housing 3. Furthermore, a torque sensor 36 is provided.

An electromechanical power steering system 100 is shown in a first exemplary embodiment in FIGS. 4 to 7. The fundamental design of the electromechanical power steering system 100 corresponds here to that which has been shown in FIGS. 2 to 3.

The design and the effect of the prestressing means in the form of the leg spring 46 can be seen in FIGS. 4 to 6. Correspondingly, the leg spring 46 is accommodated in a spring receptacle 429 concentrically with respect to the pin 44. The leg spring 46 is supported with a first arm 462 on the housing 3. By means of a second arm 464, having a double bend and bearing against the mount 42, of the leg spring 46, the latter is then prestressed about the pivoting axis S in the direction of the worm gear 20. Alternatively, other springs or elastic elements can also be provided for prestressing the mount, such as, for example, tension springs, leaf springs or compression springs. Furthermore, alternative elements such as, for example, magnets can also be used for applying the prestressing force.

In contrast to the mount 42 from FIG. 3, the mount 42 in the exemplary embodiment in FIGS. 4 to 7 has a region with a circumferential material reduction 420. This region with a circumferential material reduction 420 divides the mount 42 into a first region 421 which accommodates the pin 44 and by means of which the mount 42 is pivotably held on the housing 3, and a second region 422 which accommodates the bearing 40.

In the region with the circumferential material reduction 420, the torsional rigidity of the mount 42 is reduced with respect to the adjoining first and second regions 421, 422, with the result that the mount 42 forms a torsionally weak torsion axis T which is defined in this way. Tilting of the second region 422, which accommodates the bearing 40, with respect to the first region 421 which is held on the housing 3 by the pin 44 in an essentially tilt-proof fashion is possible. Correspondingly, the second region 422 and therefore the bearing 40 which is held thereon can follow possible tilting of the worm axis 220 of the driving worm 22 at its second end 224, with the result that the second end 224 of the driving worm 22 can always be guided largely perpendicularly with respect to the bearing 40. Therefore, low-wear operation of the bearing 40 can be achieved. Such tilting of the worm axis 220 can be caused by elastic bending of the driving worm 22 which arises owing to radial forces which act on the driving worm 22 at the toothing. The tilting can also be caused by prestressing of the mount 42 and therefore also of the driving worm 22 in the direction of the worm gear 20 if, owing to the wear of the worm gear 20 or of the driving worm 22, the orientation of the worm axis 220 changes during the complete engagement generated by the prestress.

Correspondingly, the mount 42 is embodied in a torsionally weak fashion with respect to a torsion axis T which is oriented perpendicularly with respect to the worm axis 220 or the second end 224 of the worm axis 220. Given a corresponding change in the orientation of the worm axis 220 starting from the unloaded and/or original orientation of the worm axis 220, the mount 42 can be correspondingly twisted about the torsion axis T in order to ensure that the second end 224 of the worm axis 220 is always largely mounted perpendicularly in the bearing 40. Correspondingly, the second region 422 of the mount 42 is twisted with respect to the first region 421 of the mount 42, about the torsion axis T, in order to be able to make available the corresponding angle compensation.

Correspondingly, angle compensation can occur between the second region 422, bearing the roller bearing 40, of the mount 42 and the first region 421 in which the mount 42 is mounted about the pivoting axis S by means of the pin 44. Therefore, when the angle between the axis 220 of the driving worm 22 changes with respect to the pivoting axis S of the mount 42 about a torsion axis T which is embodied between the pivoting axis S and the worm axis 220, angle compensation can take place in the region of the circumferential material reduction 420 of the mount 42. By means of this angle compensation, forced conditions are reduced or avoided at the driving worm 22 and the bearing 40 which radially supports the driving worm, in the region of the bearing of the mount 42 such as, for example, a pin receptacle of the mount 42, the pin 44 itself or the region of the housing 3 in which the pin 44 is arranged.

In this context, the region with the circumferential material reduction 420 is preferably embodied in such a way that the rigidity of the mount 42 is not significantly reduced in the direction of the prestressing force applied to the driving worm 22 by the leg spring 46 or in the transverse direction with respect thereto. In other words, the region with the circumferential material reduction 420 is embodied in such a way that by means of the mount 42 the driving worm 22 can furthermore be prestressed radially toward the worm gear 20, and secure bearing of the driving worm 22 can be achieved in the bearing 40. Correspondingly, the mount 42 can securely accommodate both the radial forces of the bearing 40 and the axial forces which are transmitted to the bearing 40 by the driving worm 22.

Owing to the shape, the cross section and/or the orientation of the region with the circumferential material reduction 420, a torsion axis T is formed in the mount 42, which torsion axis T runs perpendicularly with respect to the worm axis 220 and perpendicularly with respect to the pivoting axis S, wherein the torsion axis T lies in a plane which is formed by the pivoting axis S and the worm axis 220. In other words, the torsion axis T has a point of intersection with the pivoting axis S and a point of intersection with the worm axis 220.

The mount 42 has a lower torsional rigidity about the torsion axis T than about the axis which is formed by the pivoting axis S or about axes which are parallel thereto. Furthermore, the mount 42 is preferably embodied in such a way that it is torsionally more rigid at least with respect to all the axes arranged perpendicularly with respect to the torsion axis T defined above than about the torsion axis T itself.

In other words, the mount 42 is torsionally weaker about the torsion axis T than about any axis arranged perpendicularly with respect to the torsion axis T.

From the illustration of the detail in FIG. 5 it becomes clear that the first region 421 which is bounded by the region with the circumferential material reduction 420 has a pin receptacle 428 for accommodating the pin 44, and a spring receptacle 429 for positioning the leg spring 46. The bearing 40 is accommodated in a receptacle bore 427 in the second region 422 of the mount 42.

In one preferred embodiment, the second arm 464, with a double bend, of the leg spring 46 is pressed directly onto the second region 422 of the mount 42 when viewed from the pivoting axis S, beyond the region with the circumferential material reduction 420, with the result that the direction of the prestressing force continues to point in a stable fashion in the direction of the worm gear 20 despite an angular offset, which possibly occurs between the pivoting axis S and the worm axis 220 about the torsional axis T in the case of torsion. Therefore, the torsion of the region with the circumferential material reduction 420 of the mount 42 is not influenced or is only influenced to a small degree, as a result of which the stability of the bearing device 4 is increased further radially with respect to the worm axis 220, in the region of the toothing.

The design of the bearing device 4 is shown once again in FIG. 6 in an exploded illustration, wherein the arrangement and orientation of the individual components of the bearing device 4 with respect to the pivoting axis S and the worm axis 220 of the driving worm 22 can be inferred. Correspondingly, the pin 44 which positions the mount 42, the pin receptacle 428 of the mount 42 and the leg spring 46, which is positioned on the mount 42 by means of the spring receptacle 429 are arranged concentrically with respect to the pivoting axis S. Furthermore, the receptacle drilled hole 427 in the mount 42 for accommodating the bearing 40, the bearing 40 and the driving worm 22 are arranged concentrically with respect to the worm axis 220.

FIG. 6 shows a coordinate system which relates to the mount 42 and has a first coordinate axis X1, a second coordinate axis Y1 and a third coordinate axis Z1. The second coordinate axis Y1 is located concentrically with respect to the receptacle drilled hole 427, the first coordinate axis X1 points in the direction of the prestressing force by means of which the driving worm 22 is prestressed toward the worm gear 20 by means of the leg spring 46 and via the mount 42 and the bearing 40, and the third coordinate axis Z1 points away from the pivoting axis S, orthogonally with respect to the first coordinate axis X1 and with respect to the second coordinate axis Y1. Owing to the configuration of the region with the circumferential material reduction 420, the mount 42 has a high degree of rigidity in the direction of the first coordinate axis X1 as well as in the direction of the third coordinate axis Z1, and consequently radially with respect to the receptacle drilled hole 427, compared to a fully formed mount. It is therefore ensured that the driving worm 22 is positioned in a stable fashion during the operation of the device 2. The torsion axis T is oriented in the direction of the third coordinate axis Z1, but lies centrally in the mount 42, that is to say central in the material thickness of the mount 42, when viewed in the direction of the second coordinate axis Y1.

The mount 42 of the FIGS. 4 to 6 is shown in FIG. 7 in a schematic, perspective view of a detail. The first region 421 of the mount 42 is adjoined by the region with the circumferential material reduction 420 which separates the first region 421 from the second region 422 which surrounds the receptacle drilled hole 427 of the mount 40. The region with the circumferential material reduction 420 is arranged here in such a way that the torsion axis T is embodied perpendicularly with respect to the worm axis 220 and runs centrally through the mount 42.

The further embodiment of a mount 42 which is shown schematically in FIGS. 8 and 9 corresponds essentially to the mount 42 from FIGS. 4 to 7, wherein the mount 42 has, instead of the region with a circumferential material reduction for reducing the torsional rigidity, local material cutouts 424, delimited from one another, in the region between the first region 421 and the second region 422. Here, the mount 42 is shown in FIG. 8 in a schematic perspective illustration and in FIG. 9 in a schematic sectional illustration through the region having the material cutouts 424.

The material cutouts 424 are made available in this case as drilled holes 425 and grooves 426. The external dimensions of the mount 42 are therefore essentially retained. In the schematic sectional illustration shown in FIG. 9 through the region of the mount 42 having the material cutouts 424, it becomes clear that the axial geometrical moments of inertia, and therefore the flexural rigidities, are essentially uninfluenced by the central and axially symmetrical arrangement of the drilled holes 425 and grooves 426 in relation to the cross section of the mount 42, and that the torsional geometrical moment of inertia and therefore the torsional rigidity is significantly reduced by the regions which are open at the edges and are generated by means of the drilled holes 425 and grooves 426, compared to a mount with a full cross section.

As a result, angle compensation between the pivoting axis S and the axis of the receptacle drilled hole 427 is made possible by the twisting of the mount 42 in the region having the drilled holes 425 and grooves 426. The torsion axis T runs here again centrally through the mount 42 and intersects the pivoting axis S and the worm axis 220.

FIG. 10 shows a schematic perspective illustration of parts of a device 2 for applying an auxiliary force in an electromechanical power steering system 100 in an alternative embodiment. The design of the device 2 corresponds essentially to that from FIGS. 2 and 3, wherein the mount of the device 2 is made available here by an elastic sheet-metal part 6 which is rigidly attached, preferably spot-welded, to the housing (not shown here). The sheet-metal part 6 comprises a first region 61, with which the sheet-metal part 6 is connected in a rotationally fixed fashion to the housing (not shown here) via an attachment point 64 which is indicated schematically, and a second region 62 which is provided essentially for accommodating the bearing 40 which supports the driving worm 22 radially.

The thickness direction d of the sheet-metal part 6 extends essentially parallel to the worm axis 220 in the second region 62.

An intermediate region 63, which connects the first region 61 and the second region 62 to one another is provided between the first region 61 and the second region 62. In a load-free installation state of the device 2, the sheet-metal part 6 is lightly prestressed by twisting about the torsion axis T as well as by slightly bending the sheet-metal part 6, with the result that the prestressing of the sheet-metal part 6 already applies a radial and axial prestress to the driving worm 22 in the load-free state. The torsion axis T extends in turn through the attachment point 64 and the worm axis 220.

Owing to its elasticity, a change in angle of the worm axis 220, arising during the operation of the device 2, in the region of the bearing 40 can be compensated by means of further twisting of the sheet-metal part 6 about the torsion axis T, in particular of the intermediate region 63.

The bearing receptacle 66 of the sheet-metal part 6 is indicated here merely schematically. In the present case, the outer ring of the bearing 40 is accommodated in a receptacle drilled hole in the second region 62 of the sheet-metal part 6. Alternatively, a receptacle drilled hole for the bearing 40 can also be provided with corresponding bearing projections which position the bearing 40 axially and, if appropriate, support it axially.

In a further embodiment (not shown here), a receptacle sleeve can be provided for accommodating the bearing 40 on the sheet-metal part 6. The receptacle sleeve and the sheet-metal part can be embodied in one piece here, wherein the receptacle sleeve is formed as a deep-drawn collar. In order to apply the axial prestress to the driving worm 22, a shaft shoulder (not shown in FIG. 10) for accommodating the axial forces transmitted to the driving worm 22 by the sheet-metal part 6 via the bearing 40 is arranged on said driving worm 22. Alternatively, the shaft shoulder can also be omitted, as a result of which the axial prestress of the driving worm either does not occur or is made available by means of a form fit between the inner ring of the bearing 40 and the driving worm 22 or by means for generating a form fit, for example a circlip which is arranged on the driving worm 22.

Insofar as they can be applied, all the individual features which are illustrated in the individual exemplary embodiments can be combined with one another and/or interchanged without departing from the scope of the invention.

LIST OF REFERENCE SYMBOLS

1 Steering shaft
10 Input shaft
12 Output shaft
100 Electromechanical power steering system
102 Steering wheel
104 Steering pinion
106 Toothed rack
108 Track rod
110 Steerable wheel
112 Power assistance system
114 Power assistance system
116 Power assistance system
118 Torque sensor
118' Torque sensor
120 Cardan joint
2 Device for applying an auxiliary force
20 Worm gear
22 Driving worm
24 Electric motor
200 Worm gear axis
220 Worm axis
222 First end
224 Second end
240 Output of the electric motor
3 Housing
30 Base body
32 Housing flange 34 Cover plate
36 Torque sensor
4 Bearing device
40 Bearing
42 Mount
44 Pin
46 Leg spring
400 Bearing axis of the bearing
420 Region with a circumferential material reduction
421 First region
422 Second region
424 Material cutout
425 Drilled hole
426 Bead
427 Receptacle drilled hole of the bearing
428 Pin receptacle
429 Spring receptacle
462 First arm
464 Second arm
6 Sheet-metal part
61 First region
62 Second region
63 Intermediate region
64 Attachment point
66 Bearing receptacle
S Pivoting axis
T Torsion axis
d Thickness direction of the sheet-metal part

What is claimed is:

1. An electromechanical power steering system for a motor vehicle comprising:
    an electric motor;
    a driving worm that is driven by the electric motor and is rotatable about a worm axis;
    a worm gear that is coupled to a steering shaft, wherein the driving worm interacts with the worm gear;
    a mount that holds a bearing in which the driving worm is mounted, the mount having a region defining a material cutout that comprises a circumferential material reduction, wherein the mount prestresses the driving worm in a direction of the worm gear, wherein the material cutout causes the mount to be torsionally weak about a torsion axis that is disposed perpendicularly with respect to the worm axis, and
    a pivoting axis about which the mount is pivotable, wherein the pivoting axis is essentially parallel to the worm axis.

2. The electromechanical power steering system of claim 1 wherein the mount is an elastic sheet-metal part.

3. The electromechanical power steering system of claim 2 wherein the elastic sheet-metal part is attached to a housing in a rotationally fixed fashion and with an application of the prestress.

4. The electromechanical power steering system of claim 2 wherein the elastic sheet-metal part has a thickness direction that is positioned substantially parallel to the worm axis and in a region of the elastic sheet-metal part on which the bearing is disposed.

5. The electromechanical power steering system of claim 1 wherein the material cutout comprises at least one of a drilled hole or a groove.

6. The electromechanical power steering system of claim 1 wherein the mount is prestressed against the worm gear by a spring.

7. The electromechanical power steering system of claim 1 wherein the mount is torsionally weaker about the torsion axis than about any axis arranged perpendicularly with respect to the torsion axis.

\* \* \* \* \*